United States Patent [19]
Rouse

[11] 3,792,506
[45] Feb. 19, 1974

[54] DETERGENT HOLDER ON WINDSHIELD WIPER ARM

[76] Inventor: Donald E. Rouse, 1680 S.W. 132nd St., Beaverton, Oreg. 97005

[22] Filed: June 9, 1972

[21] Appl. No.: 261,254

[52] U.S. Cl. .............................. 15/250.03, 15/103
[51] Int. Cl. ............................................ B60s 1/00
[58] Field of Search....... 15/250.04, 250.03, 250.02, 15/250.01, 250, 220 R, 103

[56] References Cited
UNITED STATES PATENTS
| | | | |
|---|---|---|---|
| 2,485,025 | 10/1949 | Wattles, Jr. | 15/250.03 |
| 2,535,805 | 12/1950 | McIntyre et al. | 15/250.03 |
| 3,103,686 | 9/1963 | Reynolds | 15/250.03 |
| 3,636,582 | 1/1972 | Wright | 15/250.03 |

FOREIGN PATENTS OR APPLICATIONS
| | | | |
|---|---|---|---|
| 1,430,670 | 3/1969 | Germany | 15/250.03 |

Primary Examiner—Leon G. Machlin
Attorney, Agent, or Firm—Lee R. Schermerhorn

[57] ABSTRACT

A detergent holder has a bracket arranged for mounting on a conventional windshield wiper arm at one side of the wiper blade. A cylindrical cake of solid detergent is received in the holder. The detergent cake is molded into a coil of plastic material which is clamped by the sides of the holder. The holder has openings on its side facing the windshield and is entirely open on its opposite side for exposure to rain water. As rain water flows over the detergent cake, some of the detergent is dissolved and blown against the windshield in the area traversed by the oscillating wiper blade.

6 Claims, 4 Drawing Figures

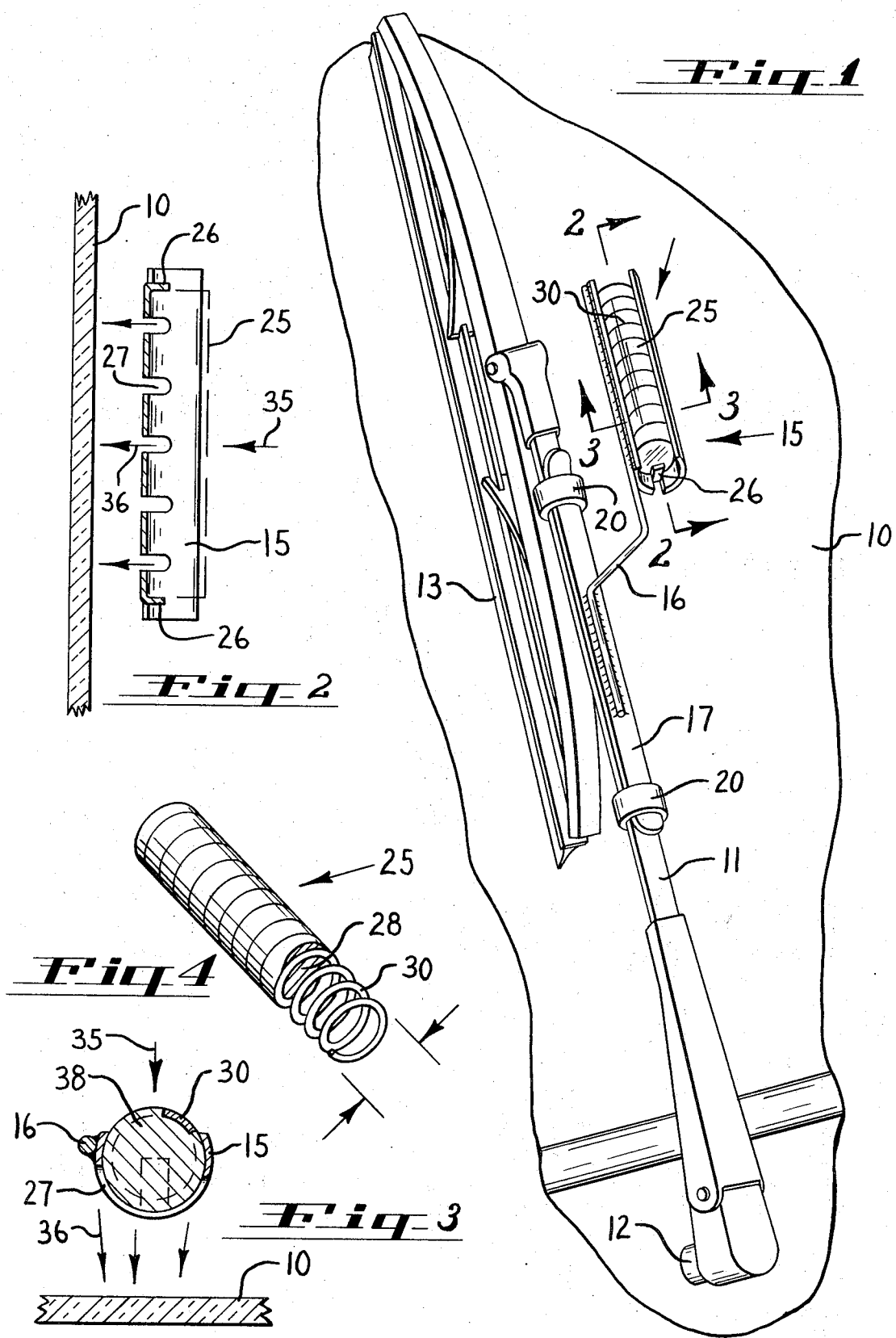

DETERGENT HOLDER ON WINDSHIELD WIPER ARM

BACKGROUND OF THE INVENTION

This invention relates to a detergent holder on a windshield wiper arm.

Nozzle-type windshield washers are ineffective at highway speeds because high velocity transverse and vertical air currents in front of the windshield blow the stream of supplied water and any detergent contained in the water either upward or to the sides of the windshield without washing the glass. Such systems are effective only at relatively low speeds or at a standstill.

Even at low speeds when the nozzle-type washers do spray water and detergent on the windshield, the application is too temporary to be effective in removing oily film. During prolonged driving in the rain, the detergent is diluted rapidly and washed away because it can be applied only intermittently.

It has also been proposed to provide a cavity for soluble cleaning material in the rubber wiper blade itself in order to insure that the cleaning agent makes contact with the glass. Such devices, however, have not met with commercial success because they require a special form of wiper blade and are not usable with conventional windshield wipers.

Objects of the present invention are, therefore, to provide a detergent holder for mounting on a standard type of windshield wiper, to provide a detergent holder of the type described which is adapted to receive a cake of solid detergent, and to provide a windshield cleaning appliance which is operated by rain water blowing against the windshield.

SUMMARY OF THE INVENTION

The present detergent holder is equipped with a supporting bracket adapted to be mounted on a standard type of windshield wiper arm. The holder contains a cake of solid detergent in a position close to the windshield and alongside the wiper blade so that falling rain will dissolve the detergent and carry it onto the area of the glass which is swept by the wiper blade. The detergent cake is preferably molded into a plastic coil which is inserted into and gripped by the holder for convenient replacement when necessary.

The device dispenses detergent continuously as long as rain is falling. In following or meeting another vehicle, some of the mixture of water and oil splashed onto the windshield from the roadway reaches the detergent cake, making the device immediately effective in removing oily film from the glass, which film would otherwise impair visibility and create a driving hazard.

The invention will be better understood and additional objects and advantages will become apparent from the following description of the preferred embodiment illustrated on the accompanying drawing. Various changes may be made in the details of construction and arrangement of parts and certain features may be used without others. All such modifications within the scope of the appended claims are included in the invention.

BRIEF DESCRIPTION OF THE DRAWING

FIG. 1 is a perspective view showing a device embodying the invention mounted on a windshield wiper arm;

FIG. 2 is a view on the line 2—2 in FIG. 1;

FIG. 3 is a view on the line 3—3 in FIG. 1; and

FIG. 4 is a perspective view, with parts broken away, showing the detergent cartridge.

DESCRIPTION OF THE PREFERRED EMBODIMENT

In FIG. 1, a portion of an automobile windshield 10 is traversed by a conventional oscillating wiper arm 11 which is pivotally mounted at 12 below the windshield. Arm 12 carries a conventional flexible rubber wiper blade 13 which bears against the windshield as the arm 11 oscillates.

The present invention is embodied in a holder 15 having a supporting bracket arm 16. Bracket arm 16 is fixedly connected to a flat bar 17 which is mounted on arm 11 by a pair of clamps 20. The clamps 20 may comprise simply rubber bands or they may be detachable metal clamping devices. Bracket arm 16 is offset as shown to position the holder 15 close to but spaced from the windshield 10 at one side of the wiper blade 13.

The holder 15 is preferably a resilient casing of semi-cylindrical shape having an arcuate extent of slightly more than 180° to provide an opening on its front side to receive and clamp the cylindrical detergent cartridge 25. The detergent cartridge is retained against lengthwise movement in the holder by a radial tongue 26 at each end of the holder. The back side of the holder which faces the windshield is provided with a plurality of openings 27.

The detergent 25 preferably comprises a detergent cake 28 molded into a helical reinforcing coil 30 which is preferably plastic but which may also be made of metal such as wire spring. The outside diameter of coil 30 is the same as the outside diameter of the detergent cake and this dimension is approximately the same as the inside diameter of casing 15. Casing 15 is sufficiently resilient to allow the detergent cake 28 with its coil 30 to be pressed into the front opening in the holder so that the opposite sides of the holder will firmly clamp the coil 30 without breaking or crumbling the detergent cake. Coil 30 provides a rigid body for the sides of holder 15 to clamp against.

In wet weather when dirty and sometimes oily water on the roadway is thrown up against the windshield by a car ahead, such water together with any rain which may be falling impinges on the exposed front side of detergent cake 28 as represented by arrow 35. This water dissolves some of the detergent cake and carries it onto the windshield in the area traversed by the wiper blade 13 as indicated by the arrows 36. When the cartridge is new and completely fills the casing 15, the water washes around the outside of the casing, carrying some dissolved detergent with it to the windshield.

As the detergent cake is partially dissolved away, the casing 15 continues to grip the coil 30 even though the detergent cake itself no longer completely fills the holder. When this occurs, the approaching rain water and road water at 35 enters the open front side of holder 15, flows around the detergent material inside of casing 15 and is discharged through openings 27 onto the closely adjacent windshield glass. The detergent in the emerging water represented by arrows 36 reacts with the dirt and oil so that these materials are cleanly removed by the squeegee action of wiper blade 13. Coil 30 holds the remaining cake together as it dissolves away, preventing crumbling and making the device effective until the last of the detergent is dissolved.

At low speeds or at standstill the conventional nozzle washers apply water to the detergent cake in the same manner with each sweep of the wiper.

Although the invention is not limited to any particular formulation of detergent, a product well suited for the present purpose is made as follows. The detergent cake contains a blend of anionic and non-ionic type detergent plus a corrosion inhibitor, including also a slow dissolving soap as a binding agent. This mixture is blended by the use of water to bring it to a heavy paste consistency. It is then compressed to cake or cartridge form in the coil 30 and oven dried.

When the detergent cake has all dissolved away from the reinforcing coil 30, the coil is readily snapped out of the open front side of casing 15 and a new cartridge snapped into the holder.

Having now described my invention and in what manner the same may be used, what I claim as new and desire to protect by Letters Patent is:

1. A detergent holder for a windshield wiper comprising an elongated casing for holding a cake of detergent, means for mounting said casing on a windshield wiper arm alongside the wiper blade and spaced away from the windshield with one side of the casing facing the windshield and the opposite side facing away from the windshield, and opening in said one side and opposite side to admit water into said casing on said opposite side and discharge said water onto said windshield from said one side, said mounting means comprising a bar, clamps for securing said bar to said wiper arm, and an offset bracket arm having one end connected to said casing and an opposite end connected to said bar.

2. A detergent holder as defined in claim 1, said casing being approximately semi-cylindrical with said opposite side open to receive said cake of detergent.

3. A detergent holder as defined in claim 2, including inwardly bent tabs in the ends of said casing to retain said cake of detergent.

4. A detergent holder as defined in claim 2 in combination with a cylindrical cake of detergent in said casing.

5. A detergent holder as defined in claim 4, said cake being molded in a coil of reinforcing material.

6. A detergent holder as defined in claim 5, the sides of said casing resiliently clamping said reinforcing coil.

* * * * *